J. A. RHODES.
SPRAYING APPARATUS.
APPLICATION FILED OCT. 23, 1920.

1,416,065.

Patented May 16, 1922.

Inventor
John A. Rhodes, by
T. C. Witherspoon
Attorney

UNITED STATES PATENT OFFICE.

JOHN A. RHODES, OF MACON, GEORGIA, ASSIGNOR OF ONE-THIRD TO ALBERT E. JORDAN AND ONE-THIRD TO HORATIO H. NEWMAN, BOTH OF SANDERSVILLE, GEORGIA.

SPRAYING APPARATUS.

1,416,065.  Specification of Letters Patent.  Patented May 16, 1922.

Application filed October 23, 1920. Serial No. 419,060.

*To all whom it may concern:*

Be it known that I, JOHN A. RHODES, a citizen of the United States, residing at Macon, in the county of Bibb and State of Georgia, have invented certain new and useful Improvements in Spraying Apparatus; and I do hereby declare the following to be a full, clear, and exact description of the invention, such as will enable others skilled in the art to which it appertains to make and use the same.

This invention relates to spraying apparatus and has for its object to provide an apparatus of this character which will be simple in construction, comparatively inexpensive to manufacture, and more efficient in action than those heretofore proposed.

With these and other objects in view, the invention consists in the novel details of construction and combinations of parts more fully hereinafter disclosed and particularly pointed out in the claims.

Referring to the accompanying drawings forming a part of this specification in which like numerals designate like parts in all the views.

Figure 1:
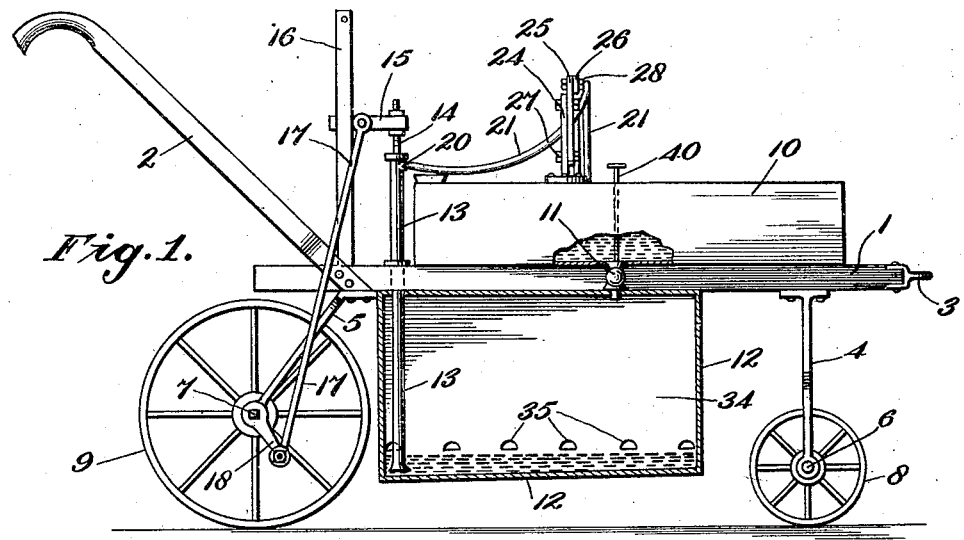
Figure 1 is a diagrammatic side elevational view partly in section of one form of device made in accordance with this invention.
Figure 2:
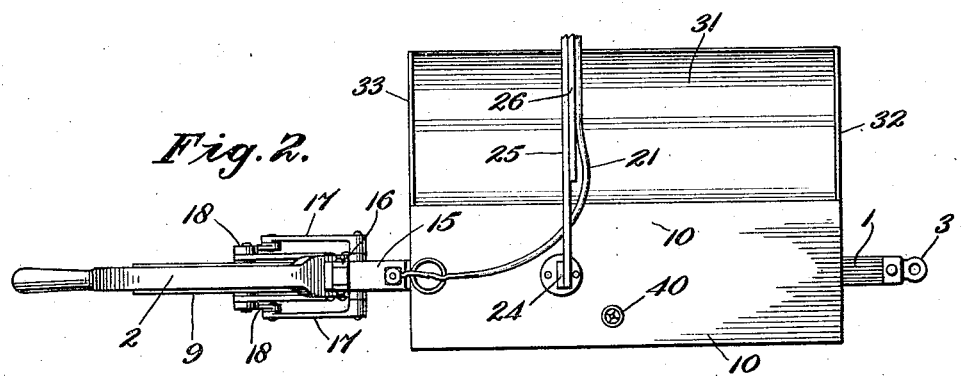
Figure 2 is a top plan view of the parts shown in Figure 1.

1 indicates any suitable frame work, here shown as a single longitudinally extending beam provided at or near one end with a handle 2 and at its other end with an eye or link 3 adapted to be connected to a portion of the harness of a draft animal. The frame 1 is also provided with the supports 4 and 5, in which are suitably journalled on the axles 6 and 7, the wheels 8 and 9, as shown.

10 indicates a supply tank or other suitable receptacle mounted upon the frame work 1 in any desired manner, and communicating through the valve 11 with a second receptacle or tank 12 here shown as hung beneath the frame member 1. Carried by the frame 1 and extending into the interior of the said tank 12 is a pump 13 provided with a piston rod 14, having a cross head member 15 rigid therewith, and adapted to reciprocate vertically between the guide members 16, also rigid with the frame 1. The cross head member 15 is connected by means of the pitman or connecting rod 17 to the crank member 18 rigid with the axle 7, of the wheel 9, as will be clear from Figure 1.

Figure 3:
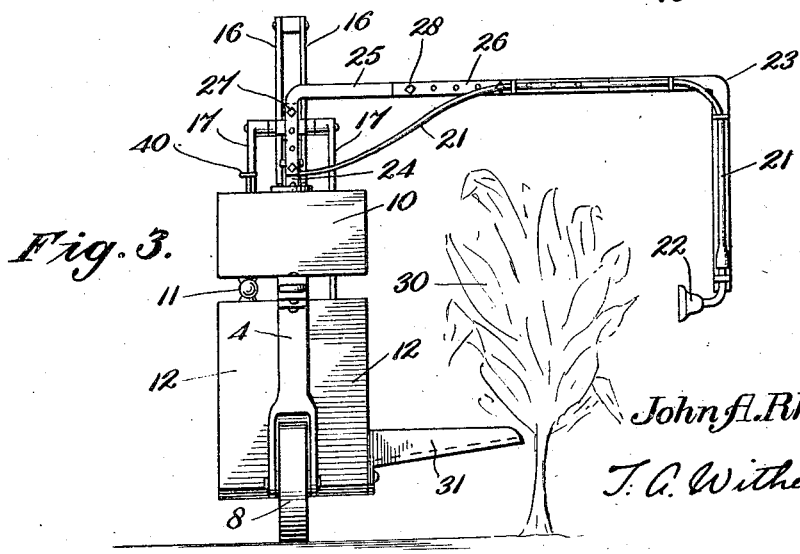
Figure 3 is an end elevational view of the parts shown in Figure 1 as seen from the right of said figure, illustrating diagrammatically the apparatus in use for spraying cotton or other plants.

The pump 13 may be of any desired type, here shown as a plunger pump adapted to deliver a constant supply of fluid to its outlet 20, which outlet may be connected by means of the rubber hose or other piping 21 to any desired form of spray nozzle 22, see Figure 3. The said tube 21 and nozzle 22 may be supported in any suitable manner, as, for example, by the angularly disposed supporting member 23, which member may comprise a plurality of sections such as 24, 25, and 26, provided with means such as 27 and 28, whereby the said sections may be adjusted manually to accommodate various sizes of plants, such as 30, which are to be treated.

In the use of spraying devices of this character, so far as I am aware, the practice has heretofore been to simply deliver the spray liquid to the nozzles, such as 22 either constantly or intermittently, according to the type of pump used, the said liquid being delivered to the plants in the form of a spray, as is well known. Owing to the fact, however, that no provision has been made to accurately gauge the amount of liquid necessary for the spraying of a single plant, a great deal has been lost, due to the fact that a surplus amount has been delivered to the plants, which surplus liquid has merely run off onto the ground, and thus has been wasted. In using certain types of spraying liquids, which are more or less expensive, this constitutes quite an appreciable item in the cost of spraying a field of cotton, for example.

In order to catch this said waste liquid and to conserve it as much as possible, I have provided on the side of the tank 12 a drip pan or trough 31 preferably inclined slightly, as shown in Figure 3, and provided with suitable ends 32 and 33. The said pan may be rigidly secured to the wall 34 of the receptacle 12, which wall is provided with one or more perforations 35, see Figure 1, to permit the return of the liquid caught by the said pan 31 to the said receptacle 12. It thus results that a large portion of the surplus liquid which is supplied to the plants 30 and which has heretofore been lost may thus be recovered and used over again.

The operation of the device will be clear from the foregoing, but may be briefly summarized as follows:

When it is desired to spray a field of cotton, or other plants, the supply tank 10 is filled with the insecticide or other spray liquid, the valve 11 may be opened by means of its controlling handle 40 so as to regulate the feed of the said liquid into the tank 12, the amount of such feed preferably being substantially equal to the discharge capacity of the pump 13.

The apparatus now being drawn between the rows of plants 30 in any suitable manner, the rotation of the wheel 9 on its axle 7 will rotate the crank member 18, which, through the connecting rod 17, will reciprocate the cross head member 15 vertically in the guide 16, thereby operating the plunger of the pump 13 and delivering a volume of the spray liquid from the tank 12 through the tube 21 to the spray nozzle 22. As shown in Figure 3, the said spray nozzle is preferably supported by the means 23 so as to discharge towards the tank 12, so that any of the liquid which may be blown past or between the leaves of the plant 30 will strike against the sides of the tank or will fall by gravity into the trough 31, from whence it will be returned through the openings 35 into the said tank 12, to be again pumped up through the nozzle 22, as the machine progresses.

Owing to the adjustable feature of the supporting member 23, the device is particularly adapted for use with plants during the different stages of their development. That is to say, when it is desired to spray plants soon after they have started their growth, the member 25 may be so adjusted with relation to the member 24 that the nozzle 22 will be relatively close to the ground. On the other hand, as the plants get larger, the member 25 may be raised with respect to the member 24, thereby also raising the nozzle 22 to any desired height. In like manner, the nozzle may be adjusted laterally, by the adjusting means 28 carried by the members 25, and 26, as will be clear from the drawings.

It is obvious that those skilled in the art may vary the details of construction as well as the arrangement of parts without departing from the spirit of the invention, and therefore I do not wish to be limited to the above disclosure except as may be required by the claims.

What I claim is:

1. In a device of the class described the combination of a frame; a receptacle carried by said frame; a second receptacle carried by said frame; regulable connections between said receptacles to control the flow from the second to the first receptacle; a nozzle adapted to deliver liquid to a plant; a pump associated with said first receptacle adapted to deliver liquid therefrom to said nozzle; and means associated with said first receptacle adapted to receive surplus liquid delivered from said nozzle to said plant and to return it to said receptacle, substantially as described.

2. In a device of the class described the combination of a frame provided with a wheel; a receptacle carried by said frame; a second receptacle also carried by said frame; regulable valved connections between said receptacles to control the flow from the second to the first receptacle; a nozzle adapted to spray liquid upon a plant; a pump associated with said first receptacle adapted to deliver liquid therefrom to said nozzle; connections between said wheel and pump adapted to actuate the latter; and means associated with said first receptacle, adapted to receive surplus liquid delivered from said nozzle to said plant and to return it to said receptacle, substantially as described.

3. In a device of the class described the combination of a frame provided with a wheel; a receptacle carried by said frame; a second receptacle also carried by said frame; regulable valved connections between said receptacles to control the flow from the second to the first receptacle; a nozzle adapted to spray liquid upon a plant; a pump associated with said first receptacle adapted to discharge liquid therefrom; connections between said pump and nozzle; a support for said last named connections and nozzle; and means comprising a drip pan associated with said first receptacle adapted to receive surplus liquid delivered from said nozzle to said plant and to return it to said receptacle, substantially as described.

4. In a device of the class described the combination of a frame provided with a wheel; a receptacle carried by said frame; a second receptacle also carried by said frame; regulable valved connections between said receptacles to control the flow from the second to the first receptacle; a nozzle adapted to spray liquid upon a plant; a pump associated with said first receptacle; adapted to discharge liquid therefrom; flexible connections between said pump and nozzle; an adjustable support for said last named connections and nozzle; connections between said wheel and pump, adapted to actuate the latter; and means comprising an angularly extending drip pan associated with said first receptacle adapted to receive surplus liquid delivered from said nozzle to said plant and to return it to said receptacle, substantially as described.

5. In a device of the class described the combination of a frame; a receptacle provided with a perforated wall carried by said frame; a second receptacle carried by said frame; regulable connections between said receptacles adapted to control the flow from said second to said first receptacle; a nozzle adapted to deliver said liquid to a plant; a pump associated with said first receptacle adapted to deliver liquid therefrom to said nozzle; and means comprising an inclined angularly disposed drip pan carried by the perforated wall of said first receptacle adapted to receive surplus liquid delivered from said nozzle to said plant, and to return it through said perforations to said first receptacle, substantially as described.

In testimony whereof I affix my signature.

JOHN A. RHODES.